United States Patent
Mukherjee et al.

(10) Patent No.: US 9,634,736 B2
(45) Date of Patent: *Apr. 25, 2017

(54) PERIODIC BANDWIDTH WIDENING FOR INDUCTIVE COUPLED COMMUNICATIONS

(71) Applicant: TEXAS INSTRUMENTS INCORPORATED, Dallas, TX (US)

(72) Inventors: Subhashish Mukherjee, Karnataka (IN); Anoop Bhat, Karnataka (IN); Kumar Anurag Shrivastava, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,611

(22) Filed: Jun. 30, 2016

(65) Prior Publication Data
US 2016/0315670 A1 Oct. 27, 2016

Related U.S. Application Data

(63) Continuation of application No. 14/587,817, filed on Dec. 31, 2014, now Pat. No. 9,385,790.

(51) Int. Cl.
*H03D 5/00* (2006.01)
*H03K 7/10* (2006.01)
(Continued)

(52) U.S. Cl.
CPC ......... *H04B 5/0087* (2013.01); *H04B 5/0031* (2013.01); *H04L 27/04* (2013.01)

(58) Field of Classification Search
CPC ... H04L 27/00; H04L 27/2602; H04L 27/361; H04L 27/04; H04L 27/06; H04L 27/38;
(Continued)

(56) References Cited

U.S. PATENT DOCUMENTS

| 8,629,576 B2* | 1/2014 | Levine | H02J 5/005 307/104 |
| 8,710,701 B2* | 4/2014 | Cook | H01Q 7/00 307/104 |

(Continued)

OTHER PUBLICATIONS

Karl Norling et al., "An Optimized Driver for SiC JFET-Based Switches Delivering More Than 99% Efficiency", 2012 IEEE International Solid-State Circuits Conference. pp. 284-286.

(Continued)

*Primary Examiner* — James M Perez
(74) *Attorney, Agent, or Firm* — Michael A. Davis, Jr.; Charles A. Brill; Frank D. Cimino (57) ABSTRACT

In described examples, a method of inductive coupled communications includes providing a first resonant tank (first tank) and a second resonant tank (second tank) tuned to essentially the same resonant frequency, each having antenna coils and switches positioned for changing a Q and a bandwidth of their tank. The antenna coils are separated by a distance that provides near-field communications. The first tank is driven to for generating induced oscillations to transmit a predetermined number of carrier frequency cycles providing data. After the predetermined number of cycles, a switch is activated for widening the bandwidth of the first tank. Responsive to the oscillations in the first tank, the second tank begins induced oscillations. Upon detecting a bit associated with the induced oscillations, a switch is activated for widening the bandwidth of the second tank and a receiver circuit receiving an output of the second tank is reset.

20 Claims, 8 Drawing Sheets

(51) Int. Cl.
*H03K 9/10* (2006.01)
*H03C 5/00* (2006.01)
*H04B 5/00* (2006.01)
*H04L 27/04* (2006.01)

(58) Field of Classification Search
CPC ......... H04L 27/3809; H03F 3/24; H03C 1/10;
H03C 1/50; H03B 5/10; H03B 11/08;
G11C 7/10
USPC ........ 375/219–228, 256–258, 259, 268–270,
375/286, 287, 289, 295, 300–301,
375/309–315, 316, 320–321, 340
See application file for complete search history.

(56) References Cited

U.S. PATENT DOCUMENTS

| | | | | |
|---|---|---|---|---|
| 9,020,071 | B1* | 4/2015 | Chan | H04L 27/04 375/300 |
| 9,124,120 | B2* | 9/2015 | Cook | H02J 7/025 |
| 9,385,790 | B1* | 7/2016 | Mukherjee | H04B 5/0087 375/269 |
| 2009/0009408 | A1* | 1/2009 | Rofougaran | H01L 23/66 343/702 |
| 2009/0125746 | A1* | 5/2009 | Rofougaran | H01L 23/66 713/400 |
| 2010/0015918 | A1* | 1/2010 | Liu | H04B 5/00 455/41.1 |
| 2011/0006794 | A1* | 1/2011 | Sellathamby | G01R 31/3025 324/754.03 |
| 2011/0140772 | A1* | 6/2011 | Sengupta | H03F 1/0266 330/2 |
| 2011/0163882 | A1* | 7/2011 | August | A01K 11/004 340/573.1 |
| 2011/0237206 | A1* | 9/2011 | Rajendran | H03F 3/217 455/77 |
| 2012/0064826 | A1* | 3/2012 | Darwhekar | H04B 5/0081 455/41.1 |
| 2012/0249197 | A1* | 10/2012 | Rehm | H02J 17/00 327/156 |
| 2012/0294386 | A1* | 11/2012 | Ghovanloo | A61N 1/3727 375/295 |
| 2013/0023210 | A1* | 1/2013 | Rofougaran | H01L 23/66 455/41.1 |
| 2013/0119773 | A1* | 5/2013 | Davis | H02J 5/005 307/104 |
| 2013/0315285 | A1* | 11/2013 | Black | H04B 1/18 375/219 |
| 2014/0140420 | A1* | 5/2014 | Ghovanloo | H04W 52/0209 375/259 |
| 2014/0159870 | A1* | 6/2014 | Caruana | G06K 7/0008 340/10.3 |
| 2014/0354350 | A1* | 12/2014 | Bowers | H03F 3/195 327/564 |
| 2014/0357186 | A1* | 12/2014 | Mukherjee | H04B 5/0075 455/41.1 |
| 2015/0011266 | A1* | 1/2015 | Feldt | H04M 9/082 455/570 |
| 2015/0246614 | A1* | 9/2015 | Dames | B60L 5/005 191/10 |
| 2015/0325501 | A1* | 11/2015 | Sutton | H01L 23/49503 257/676 |
| 2016/0359528 | A1* | 12/2016 | Mukherjee | H04B 5/0093 |

OTHER PUBLICATIONS

Sang Wook Han, "Wireless Interconnect using Inductive Coupling in 3D-ICs", a dissertation, University of Michigan, 2012.

* cited by examiner

PERIODIC BANDWIDTH WIDENING FOR INDUCTIVE COUPLED COMMUNICATIONS

CROSS-REFERENCE TO RELATED APPLICATIONS

This application is a continuation of U.S. patent application Ser. No. 14/587,817 filed Dec. 31, 2014, naming Subhashish Mukherjee et al. as inventors, which is hereby fully incorporated herein by reference for all purposes.

This application is related to coassigned copending application Ser. No. 14/289,895 entitled "METHOD AND APPARATUS FOR DIE-TO-DIE COMMUNICATION" filed May 29, 2014.

BACKGROUND

This relates generally to resonant inductive coupled communication systems.

Resonant inductive coupling (or electromagnetic induction) is the near-field wireless transmission of energy between two inductors (coils) between resonant circuits tuned to resonate at about the same frequency. The respective coils may exist as a single piece of equipment or include two separate pieces of equipment.

The general principle of energy transfer and efficiency for resonant inductive coupling is that if a given oscillating amount of energy (for example a pulse or a series of pulses) is forced into a primary (transmitting) coil which is capacitively loaded, the coil will "ring", so that oscillating fields will occur, with the field energy transferring back and forth between the magnetic field in the inductor and the electric field across the capacitor at the resonant frequency. This oscillation will decrease (damp) over time at a rate determined by the gain-bandwidth (Q factor) of the resonant circuit, mainly due to resistive and radiative losses. However, provided the secondary (receiving) coil cuts enough of the magnetic field that it absorbs more energy than is lost in each cycle of the primary (transmitting) coil, then most of the transmitted energy can still be transferred.

The primary coil is generally the L part of a series RLC resonant circuit (resonant "tank"), and the Q factor for such a resonant tank is given by:

$$Q = \frac{1}{R}\sqrt{\frac{L}{C}}$$

For example for R=20 ohm, C=1 μF and L=10 mH, Q=5. Because the Q factor for the resonant tank can be very high, only a small percentage of the magnetic field needs to be coupled from one coil to the other coil to achieve a reasonably high energy transfer efficiency, even though the magnetic field decays quickly with increasing distance from a coil, the primary coil and secondary coil can be several diameters apart. It can be shown that a figure of merit for the energy transfer efficiency (U) from primary coil and secondary coil is the following:

$$U = k\sqrt{Q_1 Q_2}$$

Where k is the coupling coefficient, and Q1 and Q2 are the Q's for the primary (transmitting) tank and secondary (receiving) tank. Although assuming a reasonable k-value (k<1) the energy transfer efficiency for the resonant inductive coupled communication system can be high, the data rate may be limited because for a communication channel the maximum data-rate that can be achieved is limited by the channel's bandwidth, which is given by the Q of the tank (higher Q means a lower bandwidth). For example, for a tank tuned at 1 GHz with a Q of 10, the bandwidth is only 100 MHz. For example, for a binary modulation scheme (e.g., ON-OFF keying), the maximum data-rate is 2× the available bandwidth, governed by the well-known Nyquist theorem.

SUMMARY

In described examples, a method of inductive coupled communications includes providing a first resonant tank (first tank) and a second resonant tank (second tank) tuned to essentially the same resonant frequency, each having antenna coils and switches positioned for changing a Q and a bandwidth of their tank. By adaptively changing the Q of the transmitter and receiver tanks the above-described data rate problem is solved. The antenna coils are separated by a distance that provides near-field communications. The first tank is driven to oscillate to transmit a predetermined number of carrier frequency cycles providing data. After the predetermined number of cycles, a switch is activated for widening the bandwidth of the first tank. Responsive to the oscillations in the first tank, the second tank begins induced oscillations. Upon detecting a bit associated with the induced oscillations, a switch is activated for widening the bandwidth of the second tank and a receiver circuit receiving an output of the second tank is reset.

DETAILED DESCRIPTION OF EXAMPLE EMBODIMENTS

The drawings are not necessarily drawn to scale. Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal, but may adjust its current level, voltage level and/or power level.

The above-described data rate limitation for resonant inductive coupled communication systems is particularly problematic when high speed data transfer is needed. For example, it may be desirable to achieve a 400+Mb/s data rate between semiconductor (e.g., silicon) die having respective resonant tanks with on-chip antenna coils, where in one example the tank bandwidth is <½ the desired data rate, such as about 130 MHz in one particular embodiment. This makes the desired minimum communication data rate of 400 Mb/s for binary communications not possible as this data rate is >2× bandwidth, which violates the Nyquist theorem.

Disclosed embodiments include communication methods for resonant inductive coupled communication systems, where the respective tanks each include switches that periodically reset the system memory and periodically widen the channel bandwidth (e.g., by adding resistance) to achieve a high data rate, beyond (above) the Nyquist data rate. Disclosed embodiments include methods of resonant inductive coupled communications including providing a first resonant tank (first tank) tuned to a first resonant frequency including a first switch, a first capacitor and a first antenna coil where the first switch is positioned for changing a Q and a bandwidth of the first tank, and a second resonant tank (second tank) tuned to a second resonant frequency that is essentially equal the first resonant frequency including a second switch, a second capacitor and a second antenna coil wherein the second switch is positioned for changing a Q and a bandwidth of the second tank. As used herein, tank resonant frequencies being "essentially equal" is defined to be within 10% of one another. The first antenna coil and second antenna coil are separated from one another by a distance that provides near-field communications defined herein as distance providing a minimum coupling coefficient (k) of 0.01 (or more precisely $k*(Q1*Q2)^{1/2} > 0.1$). The respective resonant tanks can be series resonant tanks or parallel resonant tanks.

The first tank is driven to oscillate with a modulated carrier signal so that the first antenna coil transmits a predetermined number of carrier frequency cycles (predetermined number of cycles) providing data that is first transition coded (i.e., a 0 to 1 transition or a 1 to 0 transition triggers transmission of carrier pulses). After the predetermined number of cycles, the first switch is activated for widening the bandwidth of the first tank referred to herein as de-Q'ing responsive to the oscillations in the first tank. Through inductive coupling the second tank begins induced oscillations, wherein upon a receiver circuit coupled to receive an output of the second tank detecting a bit associated with the induced oscillations, the second switch is activated to widen the bandwidth of the second tank (de-Qing) and the receiver circuit is reset.

By disclosed embodiments adaptively de-Q'ing the receiver tank, the received signal strength can be decoupled (independent) from the speed of the receiver tank. Disclosed switching allows the maximum available Q of the receiver tank to be used to provide a high received signal strength, and adaptive de-Q'ing allows the receiver tank during other time intervals to achieve higher speed by adaptively increasing its bandwidth.

Figure 1:
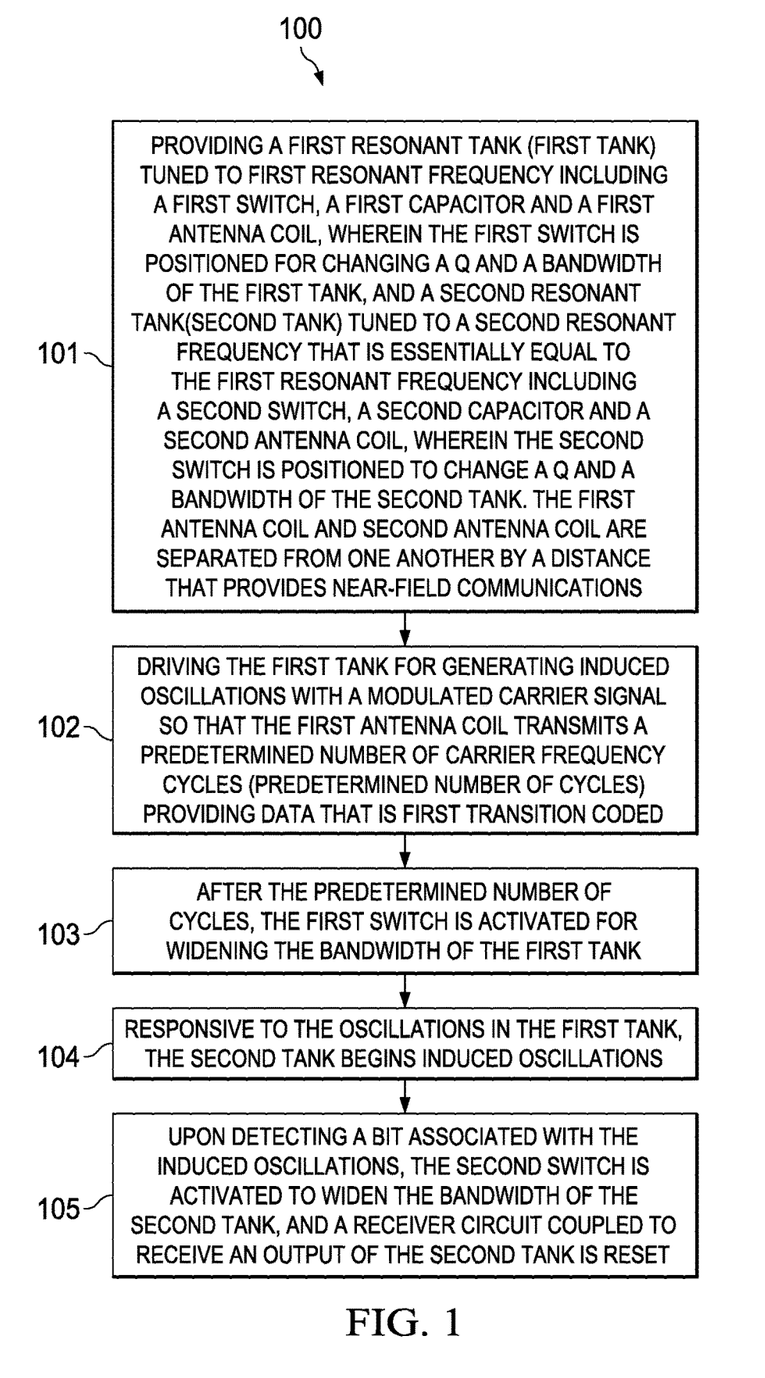
FIG. 1 is a flow chart that shows steps in an example method of resonant inductive coupled communications including periodic bandwidth widening, according to an example embodiment.

FIG. 1 is a flow chart that shows steps in an example method 100 of resonant inductive coupled communications, according to an example embodiment. Step 101 includes providing a first resonant tank (first tank) tuned to first resonant frequency including a first switch, a first capacitor and a first antenna coil, wherein the first switch is positioned for changing a Q and a bandwidth of the first tank, and a second resonant tank (second tank) including a second switch, a second capacitor and a second antenna coil, wherein the second switch is positioned for changing a Q and a bandwidth of the second tank. The second tank is tuned to a second resonant frequency that is essentially equal to the first resonant frequency. The first antenna coil and second antenna coil are separated from one another by a distance that provides near-field communications, such as from 0.5 mm to 2 mm.

Figure 8:
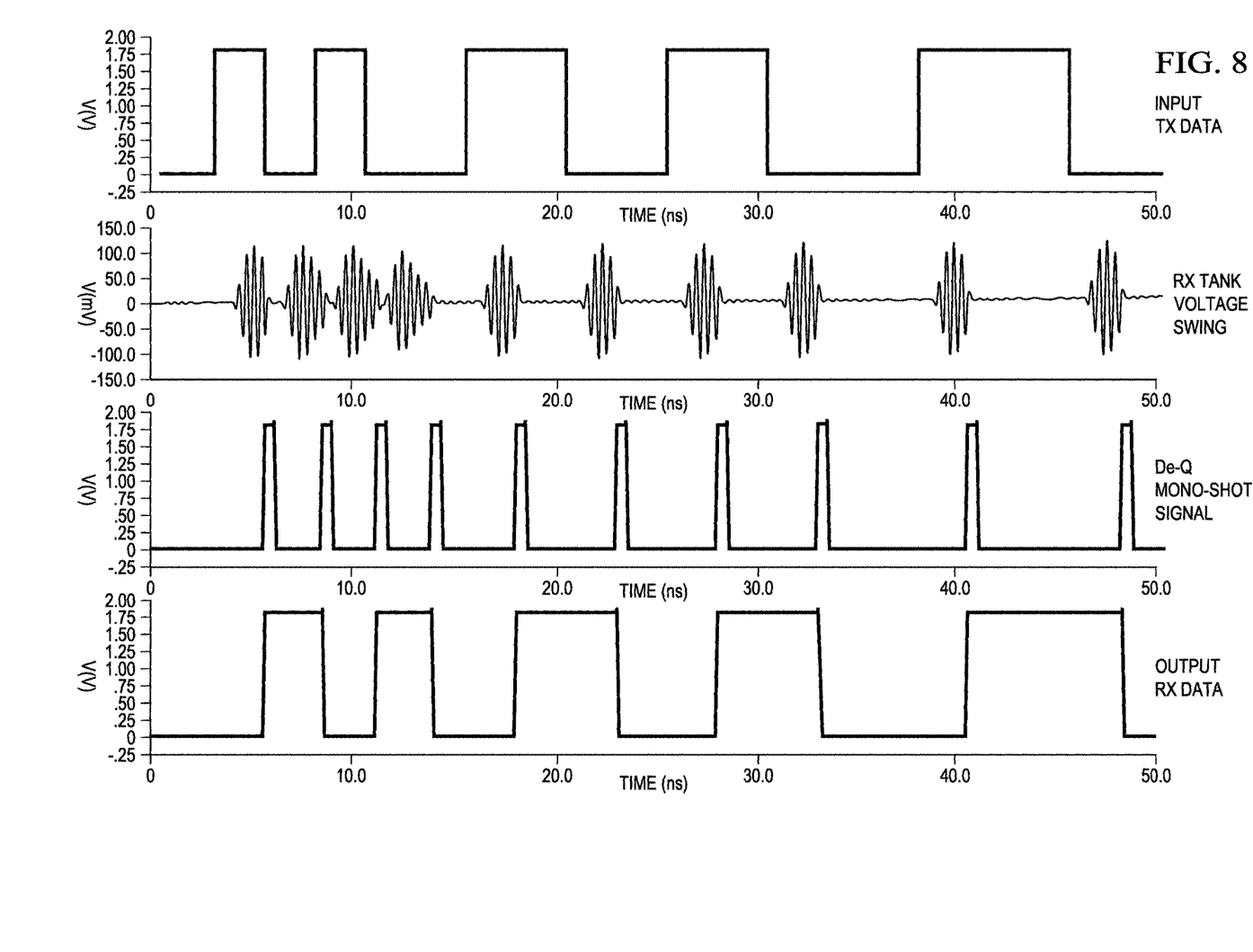
FIG. 8 shows results from a transient simulation across the receiver tank for a 400 Mbps data input (01010100110011000111) showing the data input at the top and the data output for the receiver tank on the bottom, according to an example embodiment.

Step 102 includes driving the first tank for generating induced oscillations with a modulated carrier signal so that the first antenna coil transmits a predetermined number of carrier frequency cycles (predetermined number of cycles) providing data that is first transition coded (see e.g., FIG. 8 described below). Hence for a "0" to "1" transition or a "1" to "0" transition, a fixed set of carrier frequency cycles are transmitted. In step 103, after the predetermined number of cycles, the first switch is activated for widening the bandwidth and lowering the Q (De-Qing) of the first tank. For example, after the predefined number of cycles, a series resistor can be switched into the transmitter tank to widen its bandwidth and De-Q the tank for hastening the clearing of the tank memory manifested by its ringing (e.g., see resistor R 318 and NMOS 305 SW1 in FIG. 5A described below).

Step 104 includes responsive to the oscillations in the first tank, through inductive coupling, the second tank begins induced oscillations. The induced oscillations are amplified and detected by receiver sense circuitry coupled to an output of the second tank (e.g., see receiver sense circuit 570 shown in FIG. 5A described below).

In step 105 upon detecting a bit associated with the induced oscillations, the second switch is activated to widen the bandwidth and reduce the Q of the second tank (De-Qing the second tank), and a receiver circuit coupled to receive an output of the second tank is reset. For example, when a bit is detected, the receiver can promptly begin to clear the receiver's channel memory (its ringing) to hasten getting ready for the next bit, as it is recognized herein a new bit cannot be received while the second tank is still ringing. This way, the receiver is not limited its tanks' bandwidth. Using a receiver switch, a resistor (or capacitor) can be brought in parallel to the receive tank to reset (De-Q) it (widening the tank bandwidth) (see NMOS 305 SW1 and R 318 in FIG. 5A described below). The other circuit ringing sources (e.g., filters) can be reset using a ground side switch.

The detection of a bit and subsequent control of the reset switch in the receiver tank can be accomplished using embedded hardware (embedded digital circuits and state machine) with a block level example of a receiver sense circuit 570 shown in FIG. 5A described below. A complex processor or microcontroller is not needed because the decision generally needs to be rendered fast as the loop settling time (time taken for bit detection to reset) determines the speed of operation (data rate).

Although as defined above near-field communications is defined as distance providing a minimum $U=k*(Q1*Q2)^{1/2}$ of 1, disclosed designs generally target a minimum $U>0.1$ for efficiency and receiver complexity and robustness of the design. Lower k values (larger coil separation) can be used with a more sophisticated receiver, which will generally involve more power and chip area.

A product of the maximum Q for the first tank and a maximum Q for the second resonant tank can be ≥50. The tank Q achievable for ICs is typically limited to 8 to 15. The Q can be higher (e.g., up to 35) for special processes with very thick metal such as copper. A particular value of Q is generally not important for disclosed embodiments as the de-Q mechanism described herein enables working with a large variation of Q.

The modulated carrier signal is generally at a carrier frequency from 500 MHz to 4 GHz. The carrier frequency is generally chosen based on considerations including the process capability, and data rate needed. In one particular design, a frequency of 2 GHz is chosen for a 180 nm semiconductor (e.g., silicon CMOS) process to achieve a data rate of about 400 Mb/s. One will generally need to utilize higher frequency for higher data rates. One can come down in frequency (e.g., to 500 MHz) if the needed data rate is lower. However, lower frequency oscillators are generally bulky (large L and/or large C).

Figure 2A:
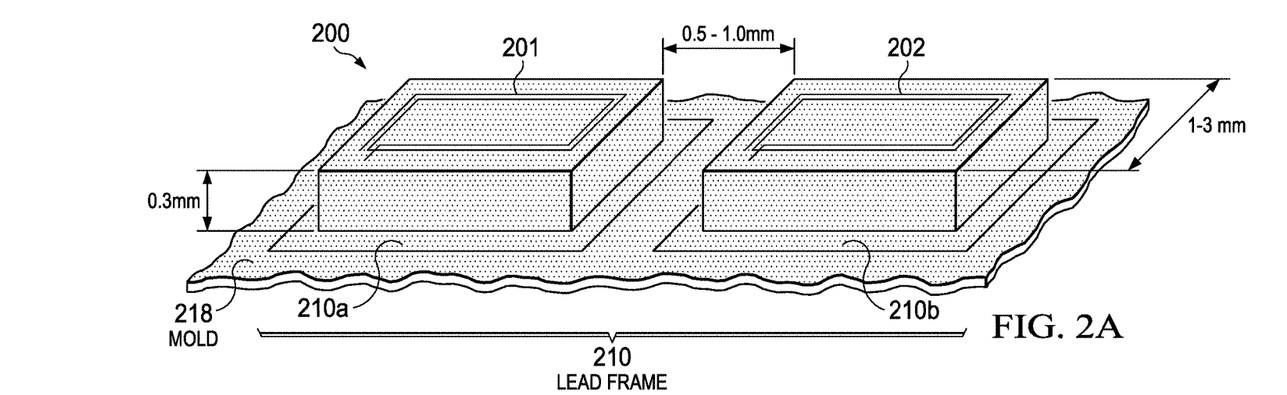
FIG. 2A is a depiction of a lateral multichip mode (MCM) package implementing disclosed resonant inductive coupled communications including periodic bandwidth widening having respective die shown as Die 1 and Die 2 on a split lead frame of the MCM to achieve a high isolation voltage between the Dies, according to an example embodiment.

FIG. 2A is a depiction of a lateral MCM package 200 implementing disclosed resonant inductive coupled communications including periodic bandwidth widening having respective die shown as Die 1 and Die 2 on a split lead frame 210 having a first die pad 210a and a second die pad 210b to achieve high voltage isolation (e.g., several thousand volts) between the respective Die, according to an example embodiment. The bond wires and leads for split lead frame 210 are not shown in FIG. 2A for simplicity. Inductive coupled communications are established between Die 1 and Die 2 with magnetic coupling between on-chip antenna coils 201 and 202 that are within respective resonant tanks with a first tank on Die 1 and a second tank on Die 2, where the respective tanks are tuned with capacitors to resonate at essentially the same tank frequency.

Although the antenna coils 201 and 202 are shown being on chip for Die 1 and Die 2, the antenna coils can also be off chip. The Die 1 to Die 2 breakdown characteristics of MCM 200 is generally determined by the mold compound (e.g., epoxy mold material) shown as mold 218 present between the respective Die. The separation distance between Die 1 and Die 2 is shown as being 0.5 mm to 1 mm as an example, but can be varied to provide different breakdown voltages. There is generally no common mode transient immunity (CMTI) issue as loop currents do not form in the antenna coils 201 and 202 due to common mode transients. Since the magnetic field is set up only when loop current flow through the antenna coils 201 and 202, a CMTI event generally does not cause any issues. Active circuits (e.g., CMOS circuits) can be implemented on Die 1 and Die 2 along with the antenna coils, such including a local oscillator and modulator on the transmitter die and a receiver circuit on the receiver die. Also, other functions, such as data-converters, high speed input/outputs (I/Os), microcontrollers, etc. can also be implemented on the same die.

Figure 2B:
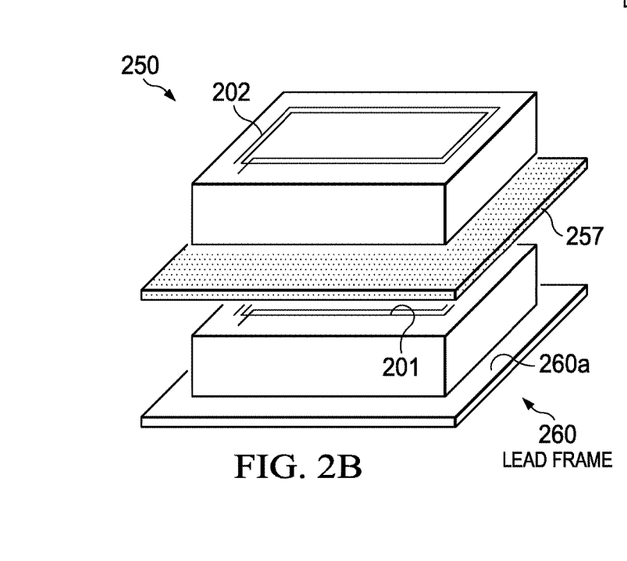
FIG. 2B is a depiction of a vertical MCM package implementing disclosed resonant inductive coupled communications including periodic bandwidth widening having respective die shown as Die 2 on Die 1 stacked on a die pad of the lead frame, according to an example embodiment.

FIG. 2B is a depiction of a vertical MCM package 250 implementing disclosed resonant inductive coupled communications including periodic bandwidth widening having respective die shown as Die 1 and Die 2 stacked on a die pad 260a of a lead frame 260, according to an example embodiment. The bond wires and leads for lead frame 260 are again not shown in FIG. 2B for simplicity. A dielectric layer 257 is shown between Die 1 and Die 2. In one arrangement Die 2 can be coupled to Die 1 using through-silicon via (TSV) technology. There can be mold between the Dies in a stacked face-to-face assembly, or there can be a laminate material between the respective Die.

MCM 200 and MCM 250 are not dependent on any specific process technology. For example, any process can generally be used that provides a suitable metal stack for forming the loops for the antenna coils 201 and 202. MCM 200 and MCM 250 can generally be used for a variety of other die-to-die coupling applications. For example, the die to die communication can be embedded as an I/O module in system-on-chips (SOCs) having other functions, such as data-converters, high speed I/Os, microcontrollers, etc. that as noted above can also be implemented on the same die.

Figure 3A:
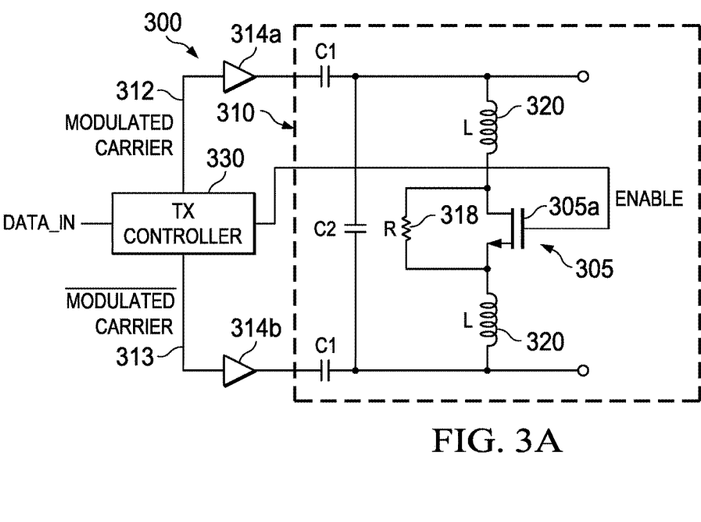
FIG. 3A depicts an example arrangement for implementing a forced resonance of a tank, according to an example embodiment.
Figure 3B:
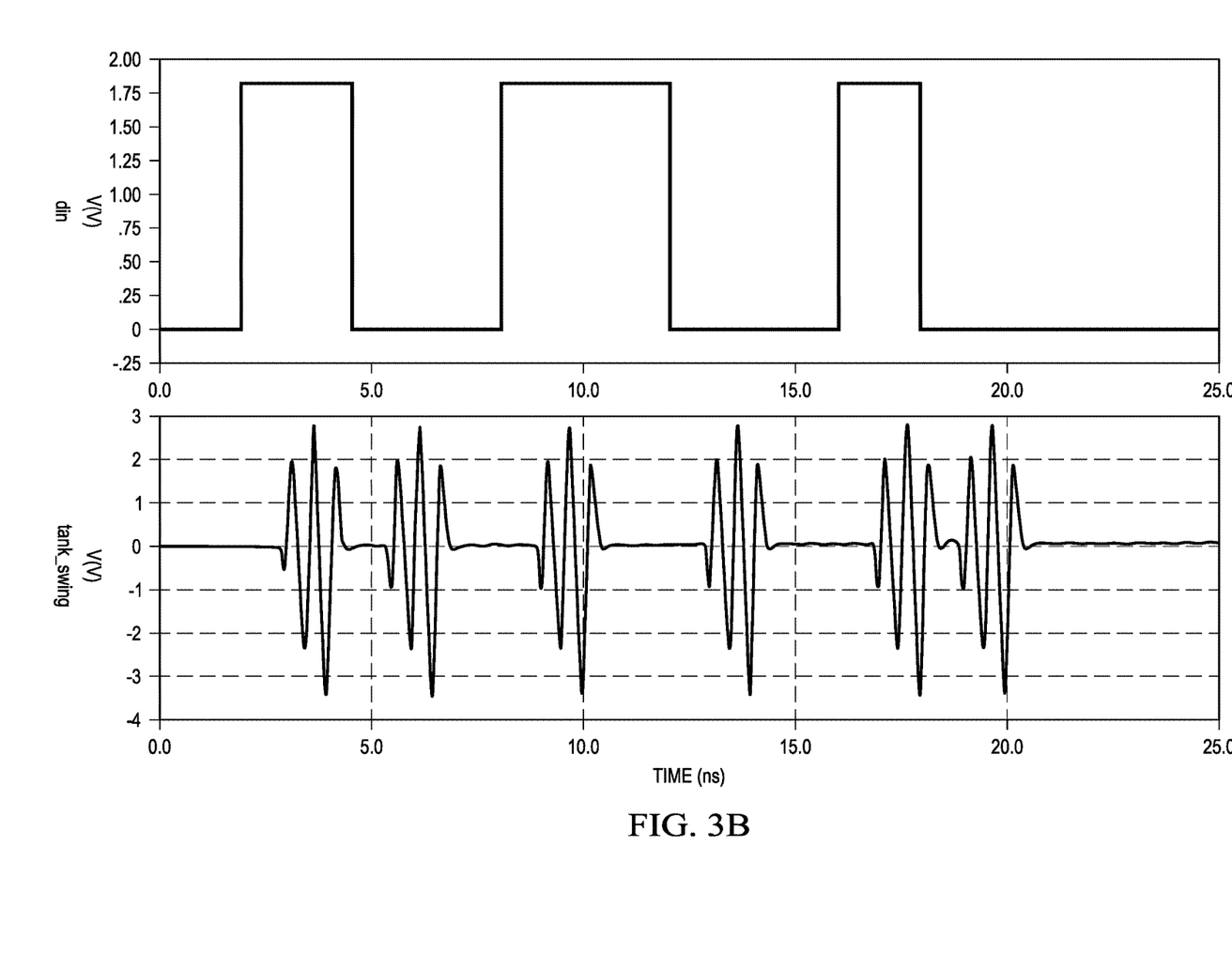
FIG. 3B depicts the input modulated carrier drive signal waveform and the resulting waveform across the antenna coils, according to an example embodiment.

FIG. 3A depicts a transmitter arrangement 300 for implementing forced resonance of a transmitter tank 310, according to an example embodiment, and FIG. 3B depicts the input modulated carrier drive signal waveform and the resulting waveform across the transmitter coils 320 shown having a first coil with an inductance of L and a second coil with an inductance of L. A transmit (TX) controller 330 receives in input driving signal shown as DATA IN, where the TX controller 330 generates the modulated carrier 312 and modulated data signal complement 313 shown. The driving signal can generally be any periodic wave (e.g., sine or square wave) tuned to the first resonant frequency. A local oscillator (not shown) can generate the square waves shown in FIG. 3B tuned to the resonant (natural) frequency of the transmitter tank 310 which provides the carrier. This carrier is modulated by data added to the carrier by the TX controller 330 to produce the modulated data signal 312 and modulated data signal complement 313 shown input via buffers 314a and 314b across the transmitter tank 310.

In an example of signal processing provided by TX controller 330 and receive processing:
1. The input data shown as DATA_IN is first transition or edge coded, i.e. generating a few (pre-determined) carrier pulses for 0->1 and 1->0 data edges. That way, when the input is steady 0 or 1 for a relatively long time, the whole system is kept idle, conserving power.
2. At the data transition edge, an oscillator (clock) is started running at 2 GHz to send a few pulses shown as modulated carriers 312 and 313 in FIG. 3A and 5A.

3. A counter counts the number of (pre-defined) oscillator pulses and then stops the transmission and resets the oscillator.
4. At this time the RESET or DE-Q (using NMOS 305 SW1 305a in FIG. 3A) pulse is generated, which lasts for half or one oscillator cycle, which turns OFF NMOS 305 SW1 to de-Q the transmitter tank 310 and rapidly dissipate the tank's energy.
5. The whole operation can be controlled can by a finite state machine, which can be implemented as hardware since it runs at 2 GHz.
6. The transmitted pulses are detected by a receiver sense circuit coupled to a receiver tank as a bit edge described below relative to FIG. 5A. The receiver sense circuit then decodes this into levels and sends out the decoded information as DATA_OUT as shown in FIG. 5A.

In one possible implementation, the transmitter tank 310 is driven through AC coupling capacitors each shown in FIG. 3A as C1. The total transmitter coil inductance of 2 L shown as separate L's resonate with the parallel combination of capacitors C1 and C2. C1 and C2 can be on the order of 1 pF. At each clock, the transmitter coils 320 receives a voltage step shown at the bottom of FIG. 3B given by:

$$Vstep=Vin*C1/(C1+C2)$$

Where Vin is the difference between the level of the modulated data signal 312 and modulated data signal complement 313 which is 3.5 V for the waveforms shown in FIG. 3B. A switch shown as an NMOS 305 SW1 which includes an enable input (gate electrode) 305a having a resistor R 318 that is in parallel to NMOS 305 SW1. NMOS 305 SW1 has an ON resistance $(R_{ON})$<<R 318. When NMOS 305 SW1 is not enabled by a suitable gate-to-source voltage coupled to enable input 305a, R 310 is introduced as a series resistance in the transmitter tank 310 for de-Qing the transmitter tank 310. When NMOS 305 SW1 is enabled (turned ON) by a suitable gate-to-source voltage coupled to enable input 305a, R 318 is bypassed by NMOS 305 SW1, which is the higher Q state of the transmitter tank 310 used for normal transmit operation.

For de-Qing, the NMOS 305 SW1 is opened which brings R 318 into the transmitter tank 310. There are 2 main reasons for including R 318 in transmitter tank 310. Firstly, R 318 reduces the Q of the transmitter tank 310 significantly, widening its bandwidth and quenching the transmitter tank 310. Secondly, R 318 limits the instantaneous voltage swing across the NMOS 305 SW1, protecting it from breakdown or reverse conduction (due to negative voltage). The second feature also limits how high a resistance for R 318 can generally be used.

FIG. 3B depicts the input modulated carrier drive signal waveform shown as din and the resulting waveform across the pair of antenna coils shown as "tank_swing". The input modulated carrier drive signal waveform is shown as a square wave having a 1.8 V amplitude. The modulated data signal 312 and modulated data signal bar 313 shown in FIG. 3A allows the transmitter tank 310 to have a tank swing that is 2 times the positive power supply (VDD) or more, and also swing negative, shown swinging from about 3 V to −3V in FIG. 3B. For example, the transmitter tank 310 can swing +/−3V when coupled to a 1.8V power supply and driven by a buffer having 1.8V transistors. To achieve fast turn-off (referred to herein as a de-Q or Quench) of the transmitter tank 310 shown in FIG. 3B of about 1 nsec, NMOS 305 SW1 acting as a series switch can be turned OFF between its inductors L. This series switch arrangement protects the NMOS 305 SW1 from high magnitude positive and negative swings.

Figure 4:
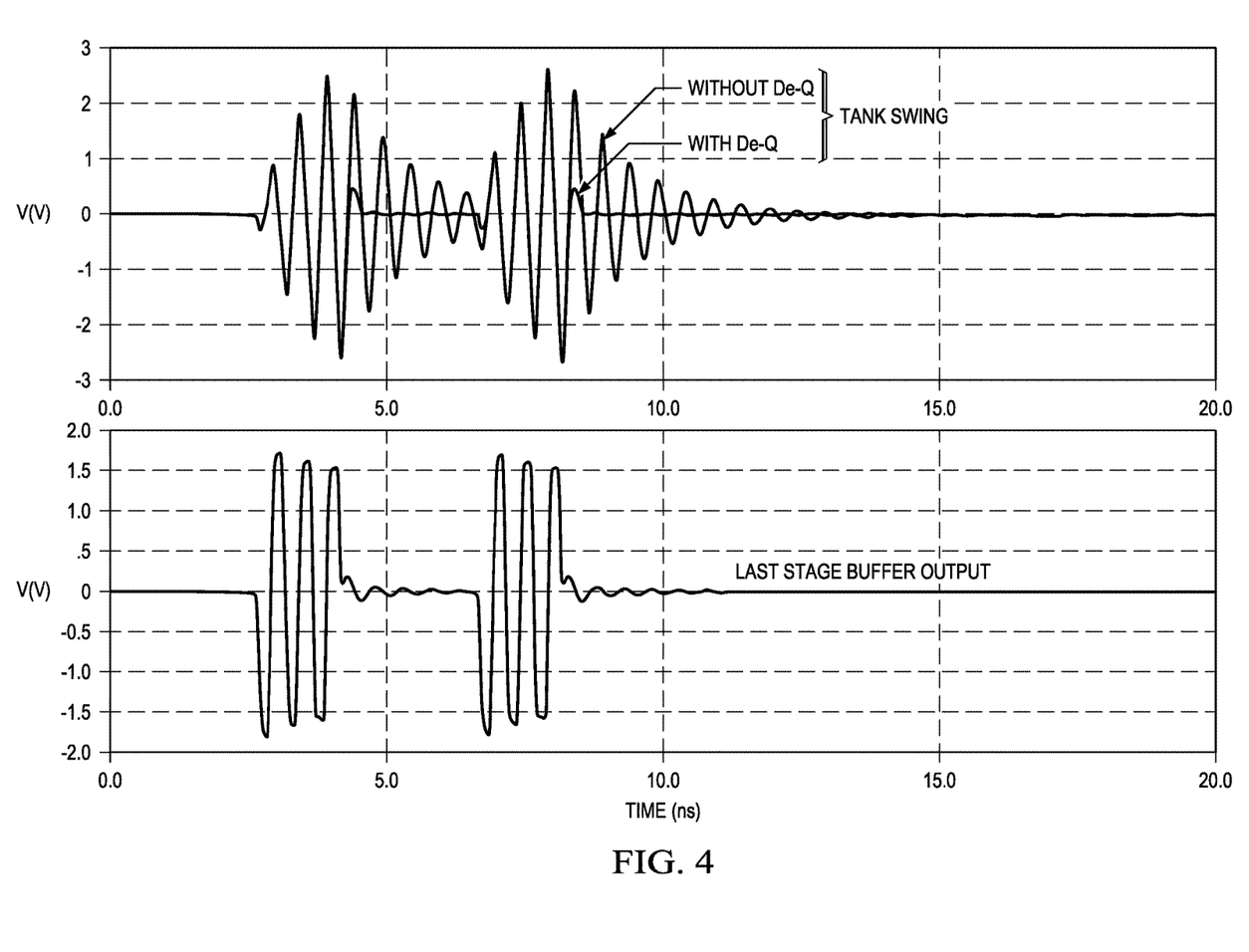
FIG. 4 top plot depicts the effect of disclosed de-Qing on a tank according to an example embodiment vs. an otherwise equivalent tank without disclosed de-Qing, and the bottom plot depicts last stage buffer output as a function of time for the disclosed transmitter tank employing de-Qing.

The top plot in FIG. 4 depicts the effect of disclosed de-Qing on a transmitter tank according to an example embodiment for the transmitter tank 310 in FIG. 3A vs. an otherwise equivalent transmitter tank without disclosed de-Qing (lacking NMOS 305 SW1 and R 318). Disclosed de-Qing (shown as "with De-Q") is seen to significantly speed the damping of the oscillations compared to the waveform without disclosed De-Qing (shown as "without De-Q"). The bottom plot in FIG. 4 depicts the last stage buffer output as a function of time for the disclosed transmitter tank employing de-Qing. The Last stage buffer output drives the transmitter tank, and is shown that only some pulses are given to the tank with 3 pulses and the NMOS 305 SW1 being ON during this case. The swing of the transmitter tank is due to these pulses only. As soon as the pulses are OFF, R 318 is brought in series by turning NMOS 305 SW1 OFF.

Figure 5A:
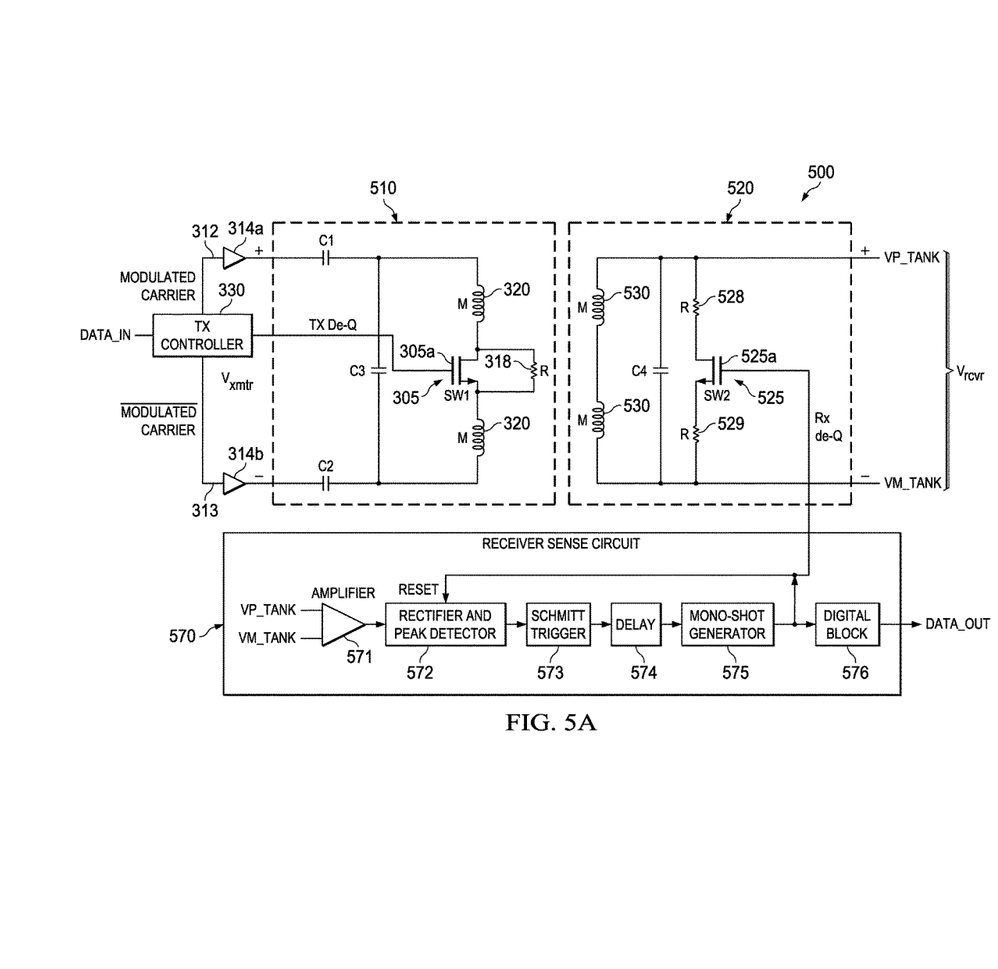
FIG. 5A depicts an example resonant inductive coupled communications system embodiment including two coupled series tanks according to an example embodiment.

FIG. 5A depicts an example resonant inductive coupled communications system 500 including an inductively coupled transmitter tank 510 including transmitter coils 320 controlled by TX controller 330, and a receiver tank 520 including receiver coils 530, including a receiver sense circuit 570 having an amplifier 571 that has inputs receiving an output of the receiver tank 520 (between VP_Tank and VM_Tank), according to an example embodiment. Receiver sense circuit 570 is shown including an amplifier 571, rectifier and peak detector block 572, Schmitt trigger 573, delay block 574, mono-shot generator 575 and digital block 576, wherein an output of the digital block 576 provides the DATA_OUT shown. The reset signal shown coupled to the rectifier and peak detector block 572 and to the gate electrode of the second NMOS 525 SW2 as a Rx de-Q signal is generated by the mono-shot generator 575. When a bit is detected, the Schmitt trigger 573 output triggers to '1' and the same is used by the mono-shot generator 575 as reset signal after a suitable delay is provided by the delay block 574.

The transmitter tank 510 uses a combination of series and parallel capacitors C1, C2 and C3. The series capacitors C1 and C2 (AC coupling capacitors) are used to drive energy into the transmitter tank 510. The series capacitors C1 and C2 also protect the driving transistors of the driving buffers 314a and 314b from the relatively high voltage generated at the transmitter tank 510.

The transmitter coils 320 is shown split into two equal coil parts with a NMOS 305 switch (SW1) in between. When NMOS 305 SW1 is ON, it essentially shorts the coils together and the inductors work as a single Inductor in a single LC circuit. This way, when ON, the NMOS 305 switch transistor (SW1) only sees a very small swing across it. The tips of the coils go through a +/−3V swing, but only a small fraction of this swing is seen by the center switch transistor NMOS 305 SW1.

Without R1 318, when the NMOS 305 SW1 switch turns OFF (for de-Qing), a large voltage spike would ordinarily appears across NMOS 305 SW1. This is avoided by keeping a parallel resistor as R1 318 to SW1. Resistor R1 318 restricts the swing across NMOS 305 SW1 by bypassing the current and also dissipating energy to lower the Q of the transmitter tank 510. This way de-Qing or quenching of the transmitter coils 320 can be handled by a low voltage rated transistor and there is still the ability to handle negative coil swings.

Receiver tank 520 is shown including a second NMOS 525 SW2 having an enable input (gate electrode) 525a shown receiving a De-Q input at the gate. Resistors shown as R2 and R3 in receiver tank 520 are switched into the receiver tank 520 to lower the Q of the tank when the enable input shown as a de-Q input turns on NMOS 525 SW2. The M with a double sided arrow shown in FIG. 5A depicts magnetic coupling between the transmitter coils 320 and the receiver coils 530.

Regarding operation of the receiver tank 520, a parallel resistance (R2 and R3, e.g., about 25 Ohms each) is shown for de-Qing. This arrangement is used for 2 main reasons. Firstly, the swing in the receiver coils 530 is generally small, typically being less than +/−300 mV. Accordingly, the switch transistor NMOS 525 SW2 (which sees the entire voltage swing when OFF) can withstand the voltage. Secondly, a switch in series to the coil (like the primary side) would need to have a low ON resistance and hence be large in size. As the switch transistor NMOS 525 SW2 is generally a large area transistor, when being turned ON and OFF it can setup parasitic oscillations, which can be falsely detected as a signal. Hence a series switch (NMOS 305 SW1) used in the transmitter tank 510 is not used in the receiver tank 520, and instead NMOS 525 SW2 is used as a parallel switch. In this scheme, the NMOS 525 SW2 switch is OFF for normal operation and turns ON when the receiver tank 520 needs to be de-Qed. This operation is exactly opposite relative to the transmitter tank 510.

Although not shown in FIG. 5A, there is a parasitic resistance (e.g. 5 to 10 ohms) inherent to the transmitter and receiver coils that cannot be accessed. The parasitic resistance results in a decrease in the inherent Q of the tank, which is generally desirable to maximize in for disclosed embodiments to provide a Q of the tank of about 10 to 12. The resistances R 528 and R 529 are shown that are switched in and out of the receiver tank 520 as needed as is R 318 in the transmitter tank 510.

During operation of the receiver sense circuit 570 when the receiver circuit 520 receives a 0' bit, the 0' bit does not have any energy in it. The receiver sense circuit 570 can be reset to '0' after every detection of '1' so that the Schmitt trigger 573 does not repeatedly trigger. The receiver sense circuit 570 needs to detect the '1' and reset to '0' within the bit period, i.e. 2 ns for the case where one is looking to achieve a maximum data rate of 500 mbps so the decision has to be taken in 2 ns and the system has to be reset after detection in 2 ns. Ideally the receiver tank 520 will develop a peak to peak voltage of 800 mV in 1.5 ns for a 1% coupling coefficient (k).

Figure 5B:
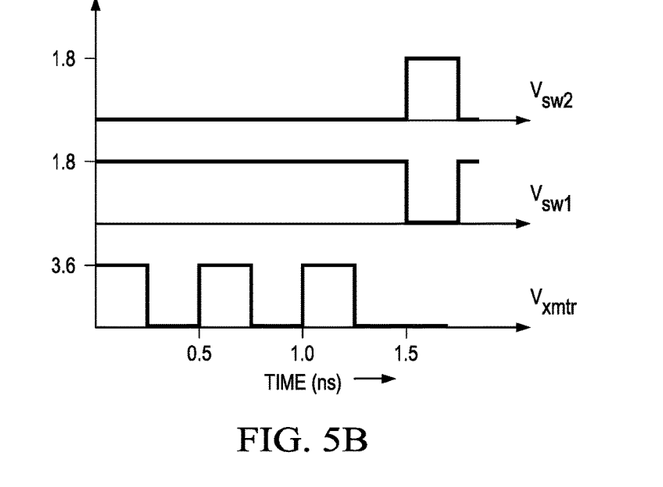
FIG. 5B depicts waveforms for the NMOS switches SW2, SW1 and transmitter voltage (Vxmtr) according to an example embodiment.

FIG. 5B depicts waveforms applied to NMOS 525 SW2, NMOS 305 SW1, and transmitter voltage (Vxmtr) which is across the transmitter tank 510. NMOS 305 SW1 and NMOS 525 SW2 are independent to each other, and independent decisions of switching NMOS 305 SW1 is taken in transmitter and of switching SW2 is taken in receiver. However, because of switching mechanism it appears they are out of phase, NMOS 305 SW1 in series of it has to be ON during transmission and NMOS 525 SW2 is in parallel, so it has to OFF during transmission else it will short the transmitter coils 320. After a bit is transmitted NMOS 305 SW1 is deactivated after some delay only bit is detected at receiver and NMOS 525 SW2 is activated, so it looks like they are out of phase. Accordingly, the phase difference between them depends upon delay in the system from transmitter to receiver.

Figure 6A:
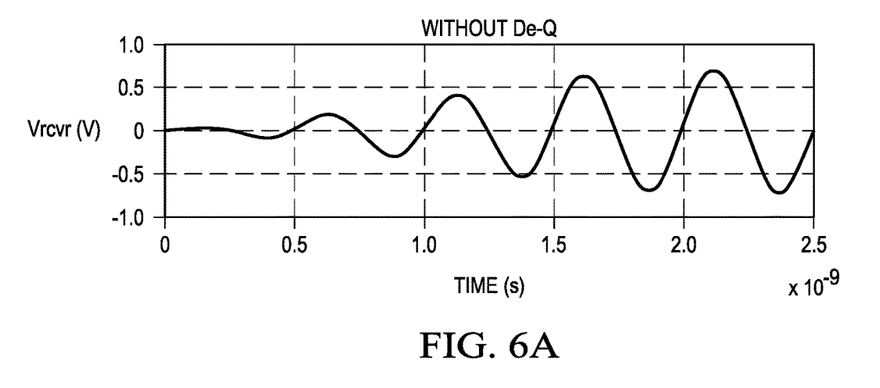
FIG. 6A depicts receiver output waveforms across a receiver tank without disclosed De-Qing and FIG. 6B depicts receiver output waveforms across an otherwise equivalent receiver tank including disclosed De-Qing, according to an example embodiment.
Figure 6B:
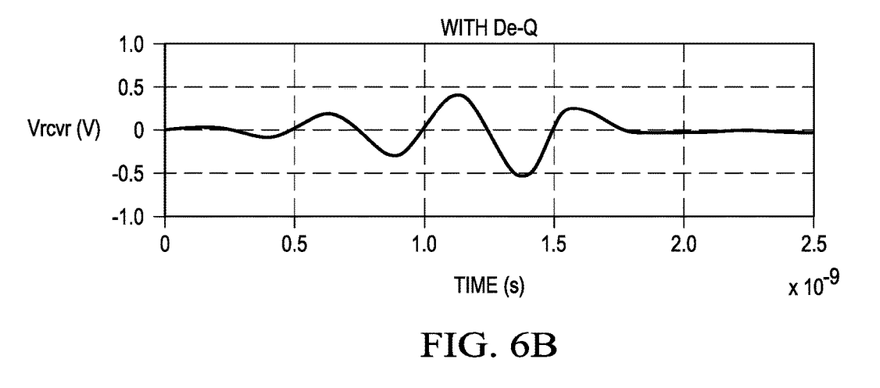

FIG. 6A depicts receiver output waveforms across a receiver tank without disclosed De-Qing and FIG. 6B depicts receiver output waveforms across an otherwise equivalent receiver tank 520 with disclosed De-Qing, according to an example embodiment. Disclosed de-Qing is seen to again speed the damping of the oscillations compared to the waveform without disclosed De-Qing.

Figure 7:
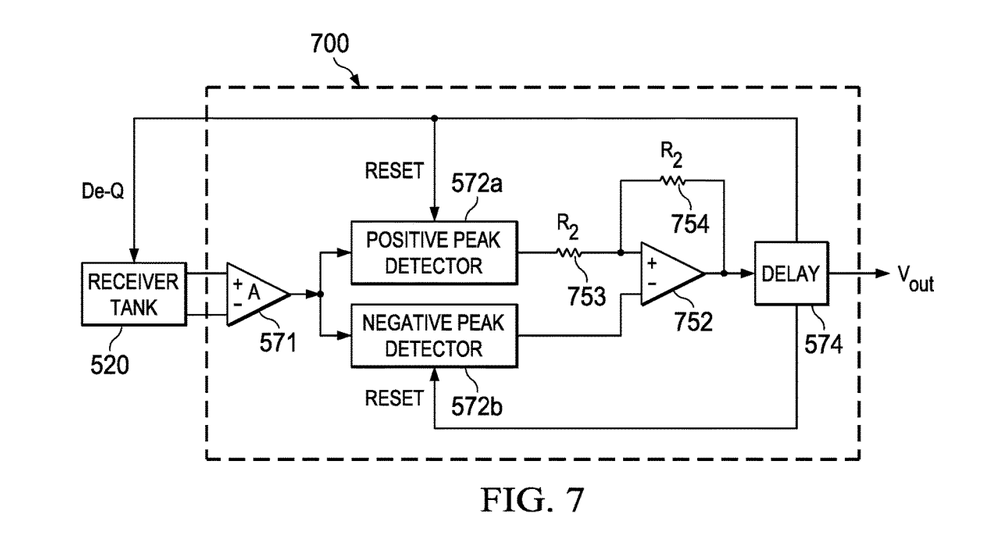
FIG. 7 shows block diagram depictions of another example receiver sense circuit architecture, according to an example embodiment.

FIG. 7 shows a block diagram depiction of another example receiver sensor architecture shown as receiver sense circuit 700, shown coupled to receive the output from a receiver tank 520 shown in FIG. 5A, according to an example embodiment. For receiver sense circuit 700 the rectifier and peak detector block 572 shown within receiver sense circuit 570 shown in FIG. 5A is replaced by a positive peak detector block 572a and a negative peak detector block 572b and the Schmitt trigger 573 shown with receiver sense circuit 570 is replaced by an amplifier 752 having an input resistor 753 and feedback resistor 754. Although not shown in FIG. 7, the Vout shown is subsequently processed by a digital block to provide a DATA_OUT signal, such by the digital block 576 shown as part of receiver sense circuit 570 in FIG. 5A.

EXAMPLES

Disclosed embodiments are further illustrated by the following specific Examples, which should not be construed as limiting the scope or content of this Disclosure in any way.

Regarding example modulation schemes, since a tuned LC coupled system provides a bandpass channel, a carrier based modulation scheme can be used. On-off keying (OOK) is the simplest form of amplitude-shift keying (ASK) modulation that represents digital data as the presence or absence of a carrier. A 500 Mbp/s data rate can be targeted with On/Off Keying (OOK). An example system' bandwidth is 130 MHz; which means a data rate of around 8 ns. A data rate of 8 ns means one cannot send new data for at least the next 8 ns because the tank retains memory of data sent earlier for a period 8 ns, restricting the data rate. To achieve data rate of about 500 Mbps, each bit needs to be transferred within about 2 ns and system memory needs to be cleared.

A disclosed De-Q technique is employed at the transmitter and at receiver to accomplish this desired data transfer rate. When bit '1' needs to be transmitted, 3 square pulses at 2 GHz are applied at the transmitter tank. When the data is '0', no signal is applied at the transmitter tank. FIG. 8 shows results from a transient simulation across the receiver tank for a 400 Mbps data input (01010100110011000111) showing the data input at the top and the data output for the receiver tank on the bottom, according to an example embodiment. The data rate shown is 400 mbps operating at room temperature.

Modifications are possible in the described embodiments, and other embodiments are possible, within the scope of the claims.

What is claimed is:

1. A method of resonant inductive coupled communication, responsive to oscillations generated by a modulated carrier signal from a first resonant tank (first tank) that is tuned to a first resonant frequency and that includes first antenna coils, a first capacitor coupled in parallel to the first antenna coils, a first resistor coupled in series between the first antenna coils, and a first switch coupled in series between the first antenna coils, the first antenna coils transmitting a predetermined number of carrier frequency cycles for providing data that is first transition coded, and the first switch being activated for widening a bandwidth and changing a Q factor of the first tank after the predetermined number of carrier frequency cycles, the method comprising:
responsive to the oscillations in the first tank, beginning induced oscillations in a second resonant tank (second tank) tuned to a second resonant frequency essentially equal the first resonant frequency and that includes: a second antenna coil that is separated from the first antenna coils by a distance that provides near-field communications; a second capacitor coupled in parallel to the second antenna coil; and a second switch coupled in parallel to the second antenna coil; and
with a receiver sense circuit, responsive to detecting a bit associated with the induced oscillations of the second tank, activating the second switch for widening a bandwidth and changing a Q factor of the second tank, and resetting the receiver sense circuit.

2. The method of claim 1, further comprising: opening the second switch to remove a second resistor from the second tank.

3. The method of claim 1, wherein the modulated carrier signal is an amplitude-shift keyed (ASK) signal.

4. The method of claim 1, wherein the receiver sense circuit includes an amplifier:
coupled to receive an output of the second tank at inputs of the amplifier; and coupled in series to a rectifier and peak detector and a delay block.

5. The method of claim 1, wherein a product of a maximum Q factor for the first tank and a maximum Q factor for the second tank is ≥50.

6. The method of claim 1, wherein the modulated carrier signal is at a carrier frequency from 500 MHz to 4 GHz.

7. The method of claim 1, wherein a first die includes the first tank, a second die includes the second tank, and the first antenna coils and the second antenna coil include metal loops.

8. The method of claim 7, wherein the first die and the second die are positioned lateral to one another on a split leadframe within a multichip package (MCP), and the first die and the second die have mold compound thereover and therebetween.

9. The method of claim 7, wherein the first die and the second die are in a stacked configuration on a substrate within a multichip package (MCP).

10. The method of claim 1, wherein the oscillations from the first tank are generated from applying a periodic wave tuned to the first resonant frequency modulated by the data.

11. A resonant inductive coupled communications system, responsive to oscillations generated by a modulated carrier signal from a first resonant tank (first tank) that is tuned to a first resonant frequency and that includes first antenna coils, a first capacitor coupled in parallel to the first antenna coils, a first resistor coupled in series between the first antenna coils, and a first switch coupled in series between the first antenna coils, the first antenna coils transmitting a predetermined number of carrier frequency cycles for providing data that is first transition coded, and the first switch being activated for widening a bandwidth and changing a Q factor of the first tank after the predetermined number of carrier frequency cycles, the system comprising:
a second resonant tank (second tank) to begin induced oscillations responsive to the oscillations in the first tank, the second tank being tuned to a second resonant frequency essentially equal the first resonant frequency and including: a second antenna coil that is separated from the first antenna coils by a distance that provides near-field communications; a second capacitor coupled in parallel to the second antenna coil; and a second switch coupled in parallel to the second antenna coil;
receiver sense circuitry coupled to: responsive to detecting a bit associated with the induced oscillations of the second tank, activate the second switch for widening a bandwidth and changing a Q factor of the second tank, and reset the receiver sense circuitry.

12. The system of claim 11, the second tank is operable to open the second switch for removing a second resistor from the second tank.

13. The system of claim 11, wherein the modulated carrier signal is an amplitude-shift keyed (ASK) signal.

14. The system of claim 11, wherein the receiver sense circuitry includes an amplifier: coupled to receive an output of the second tank at inputs of the amplifier; and coupled in series to a rectifier and peak detector and a delay block.

15. The system of claim 11, wherein a product of a maximum Q factor for the first tank and a maximum Q factor for the second tank is ≥50.

16. The system of claim 11, wherein the modulated carrier signal is at a carrier frequency from 500 MHz to 4 GHz.

17. The system of claim 11, wherein a first die includes the first tank, a second die includes the second tank, and the first antenna coils and the second antenna coil include metal loops.

18. The system of claim 17, wherein the first die and the second die are positioned lateral to one another on a split leadframe within a multichip package (MCP), and the first die and the second die have mold compound thereover and therebetween.

19. The system of claim 17, wherein the first die and the second die are in a stacked configuration on a substrate within a multichip package (MCP).

20. The system of claim 11, wherein the oscillations from the first tank are generated from applying a periodic wave tuned to the first resonant frequency modulated by the data.

* * * * *